United States Patent

Fischer et al.

[11] Patent Number: 5,975,260
[45] Date of Patent: Nov. 2, 1999

[54] HYDROKINETIC TORQUE CONVERTOR WITH BYPASS CLUTCH HAVING GROOVED FRICTION LINING

[75] Inventors: Robert Fischer, Bühl; Marco Voigt, Lauf; Uwe Wagner, Bühl; Frank Uhlmann, Sinzheim; Bernhard Zimmer, Ottenhofen, all of Germany

[73] Assignee: LuK Getriebe-Systeme GmbH, Buhl, Germany

[21] Appl. No.: 08/918,208

[22] Filed: Aug. 25, 1997

[30] Foreign Application Priority Data

Aug. 23, 1996 [DE] Germany ............... 196 34 029

[51] Int. Cl.$^6$ .............. F16D 33/00; F16D 69/00; F16D 13/72; F16H 45/02
[52] U.S. Cl. ........... 192/3.29; 192/70.14; 192/107 R; 192/113.36
[58] Field of Search .................. 192/3.29, 3.28, 192/3.3, 70.14, 70.15, 107 R, 113.36, 66.2, 70.12, 52.2, 52.3

[56] References Cited

U.S. PATENT DOCUMENTS

| | | | |
|---|---|---|---|
| 3,972,400 | 8/1976 | Howells | 192/107 R |
| 5,335,765 | 8/1994 | Takakura et al. | 192/113.36 X |
| 5,377,796 | 1/1995 | Friedmann et al. | 192/3.29 |
| 5,501,309 | 3/1996 | Walth et al. | 192/3.29 |
| 5,566,802 | 10/1996 | Kirkwood | 192/70.14 X |
| 5,667,042 | 9/1997 | Olsen et al. | 192/3.29 |
| 5,669,474 | 9/1997 | Dehrmann et al. | 192/3.29 |
| 5,738,198 | 4/1998 | Walth et al. | 192/113.36 X |
| 5,782,327 | 7/1998 | Otto et al. | 192/113.36 X |
| 5,799,763 | 9/1998 | Dehrmann | 192/70.14 X |
| 5,813,505 | 9/1998 | Olsen et al. | 192/3.28 |
| 5,878,860 | 3/1999 | Pavangat et al. | 192/107 R |

OTHER PUBLICATIONS

Norm Din 7184: Title: Form –und Lagetoleranzen 7184 –19 pages dated: May 1972.

*Primary Examiner*—Charles A. Marmor
*Assistant Examiner*—Ankur Parekh
*Attorney, Agent, or Firm*—Darby & Darby

[57] ABSTRACT

The bypass clutch in the fluid-containing housing of the hydrokinetic torque converter in the power train of a motor vehicle is provided with a first friction surface carried by a radially extending or conical section of the housing, and with a complementary friction surface carried by an axially movable piston or by an intermediate clutch plate of the bypass clutch. At least one of the friction surfaces is provided with an array of pockets and/or channels for a fluid (such as oil) which withdraws friction heat developing when the bypass clutch is partially engaged so that the friction surfaces contact but slip relative to each other. The depth and/or the width of the channels is at least substantially constant, and such channels can include bends between straight channel sections. The inlets of the channels can be located at the radially inner or radially outer marginal portion and their outlets can be located at the radially outer or inner marginal portion of the respective friction surface.

41 Claims, 7 Drawing Sheets

HYDROKINETIC TORQUE CONVERTOR WITH BYPASS CLUTCH HAVING GROOVED FRICTION LINING

BACKGROUND OF THE INVENTION

The invention relates to improvements in torque transmitting systems in general, and more particularly to improvements in torque transmitting systems which can be utilized in the power trains of motor vehicles, for example, to transmit torque between a prime mover (such as an internal combustion engine or a hybrid engine) and a manually operable or automated gearbox. Still more particularly, the invention relates to improvements in torque transmitting systems of the type known as hydrokinetic torque converters with bypass or lockup clutches.

As a rule, a hydrokinetic torque converter comprises a housing or casing which is connected to and can be rotated by the output element of a prime mover (such as the camshaft or crankshaft of a combustion engine), a pump which is mounted in and can be of one piece with the housing, a turbine which is confined in and coaxial with the housing and can rotate with as well as relative to the housing so that its hub can transmit torque to a rotary input element (e.g., a shaft) of the gearbox, an optional stator in the housing between the pump and the turbine, and a bypass or lockup clutch which can operate with as well as without slip so as to transmit torque between the housing and the turbine. The bypass clutch can comprise a piston which is movable axially of the housing in order to disengage, partially engage (with slip) or fully engage (without slip) the clutch so that the latter can transmit a selected torque between a portion of the housing and the hub of the turbine. The connection between the piston of the bypass clutch and the turbine can comprise one or more shock absorbing dampers, and the piston is movable axially by a pressurized fluid (e.g., oil) which is confined in the housing. To this end, the piston divides an internal chamber of the housing into two compartments or plenum chambers. If the fluid pressure in one of the compartments is raised above that in the other compartment, the piston can be moved axially of the housing from a position corresponding to a fully engaged condition of the bypass clutch, through a plurality of intermediate positions in which the clutch operates with slip, to a position corresponding to a fully disengaged condition of the clutch. Inversely, if the fluid pressure in the other compartment rises above that in the one compartment, the piston is moved axially of the housing in the opposite direction, i.e., to change the condition of the bypass clutch from the fully disengaged condition, through a desired number of partially engaged conditions (operation with a selected slip) and to the fully engaged condition.

The piston of the bypass clutch can be provided with a friction lining having an exposed friction surface which can contact, with or without slip (or move to a position entirely out of contact with), a complementary friction surface, e.g., directly on a section of the housing of the torque converter or on a friction lining which is affixed to the housing. It is also possible to employ a single friction lining which is bonded or otherwise affixed to the housing and has a friction surface arranged to contact a complementary friction surface on the piston of the bypass clutch.

It is also known to provide the friction surface of a friction lining, the friction surface of the piston of the bypass clutch, and/or the friction surface of the housing of the hydrokinetic torque converter with one or more channels for one or more fluid streams serving to withdraw heat from the bypass clutch and, if necessary, from certain other constituents of the torque converter and/or its bypass clutch (e.g., from the aforementioned damper or dampers). If the channel or channels is or are provided in a generally washer-like friction lining, each such channel can have an inlet in the radially inner or in the radially outer marginal portion and an outlet in the radially outer or in the radially inner marginal portion of such friction lining. Reference may be had to published German patent application Serial No. 1 950 0814 and to the corresponding United States patent(s) and/or patent application(s). The disclosure of each United States patent and of each allowed United States patent application mentioned in this specification is incorporated herein by reference.

Presently known torque converters of the above outlined character exhibit the drawback that the flow of fluid coolant along the friction surface(s) of the bypass clutch is not entirely satisfactory (predictable), for example, when the clutch operates with slip. Thus, if the fluid conveying channels or grooves extend in directions other than exactly or substantially radially of the piston and the bypass clutch operates with a certain amount of slip between the abutting friction surfaces (one of which is caused to rotate with the housing of the torque converter and the other of which is provided (directly or indirectly) on the piston), the normally viscous fluid flowing in the channels of one friction surface is maintained in frictional engagement with the other (complementary) friction surface to thus produce a retarding force (drag) which is proportional to the slip of the bypass clutch. This can exert an adverse influence upon the distribution of pressures at the bypass clutch, e.g., it can entail an undesired engagement of the bypass clutch with resulting considerable discomfort to the occupant or occupants of the motor vehicle in which the torque converter is put to use.

Another drawback of presently known hydrokinetic torque converters employing fluid-cooled bypass or lockup clutches is that the characteristics of the channels or grooves in the friction surface(s) are not selected with a view to prevent the development of eddy currents which affect the quality of the heat-withdrawing (cooling) action of the fluid medium in such channels or grooves.

OBJECTS OF THE INVENTION

An object of the invention is to provide the bypass or lockup clutch of a hydrokinetic torque converter with a novel and improved cooling or heat withdrawing system which is more reliable and more effective than heretofore known cooling systems for bypass clutches.

Another object of the invention is to provide a novel and improved bypass or lockup clutch (hereinafter called bypass clutch) for use in a hydrokinetic torque converter, particularly for use in the power trains of motor vehicles.

A further object of the invention is to provide a novel and improved cooling or temperature influencing system for the friction surface or surfaces of one or more component parts in a bypass clutch for use in hydrokinetic torque converters.

An additional object of the invention is to provide novel and improved friction linings for use in the bypass clutches of hydrokinetic torque converters.

Still another object of the invention is to provide a novel and improved method of withdrawing heat from one or more component parts of a bypass clutch in a hydrokinetic torque converter, particularly for use in the power trains of motor vehicles.

A further object of the invention is to provide a bypass clutch whose operation is more predictable and more reliable than that of heretofore known bypass clutches for use in hydrokinetic torque converters.

Another object of the invention is to provide a bypass clutch which is designed to avoid unexpected and/or untimely changes in the magnitude of transmitted torque, such as unexpected and untimely full engagement of the bypass clutch.

An additional object of the invention is to provide a bypass clutch which exhibits the above-enumerated advantages over but is not and need not be more expensive and/or more complex and/or bulkier than heretofore known bypass clutches.

Still another object of the invention is to provide a hydrokinetic torque converter which embodies the above outlined improved bypass clutch, as well as to provide power trains which employ such hydrokinetic torque converters.

A further object of the invention is to provide the friction surfaces of component parts of a clutch, such as a bypass clutch for use in a hydrokinetic torque converter, with novel and improved arrays or systems or distributions of coolant conveying passages.

Another object of the invention is to provide novel and improved dimensionings and configurations of coolant conveying channels in the friction surfaces of component parts of friction clutches.

An additional object of the invention is to provide a bypass clutch which can be installed and put to use in existing hydrokinetic torque converters as a superior substitute for conventional bypass clutches between the housings and turbines of such torque converters.

Still another object of the invention is to provide a bypass clutch which exhibits some or all of the above outlined features and advantages and at least some constituents of which can be assembled into one or more modules or units to facilitate and to simplify the construction, storage, shipment to the locales of use and/or installation in hydrokinetic torque converters or, with such torque converters, in the power trains of various types of motor vehicles.

Another object of the invention is to provide a modular bypass clutch and a modular hydrokinetic torque converter embodying such bypass clutch which can be installed in a power train in such a way that one or more steps which are necessary in connection with the installation of conventional bypass clutches and/or conventional hydrokinetic torque converters can be simplified and/or dispensed with.

An additional object of the invention is to provide a simple, compact and inexpensive bypass clutch which is more reliably cooled and has a much longer useful life than heretofore known bypass clutches for use in hydrokinetic torque converters which can serve as means for transmitting torque in the power trains of passenger cars, trucks and other types of motor vehicles.

Still another object of the invention is to provide a novel piston for use in a bypass clutch and to provide a novel housing for use in a hydrokinetic torque converter.

SUMMARY OF THE INVENTION

One feature of the present invention resides in the provision of a hydrokinetic torque converter which comprises a rotary housing arranged to contain a supply of a fluid (such as oil) and to receive torque from the rotary output element of a suitable prime mover, a pump which is disposed in and can form part of the housing, a turbine which is also disposed in and can rotate with as well as relative to the housing about a common axis and can transmit torque to a rotary input element of a driven unit (such as a gearbox in the power train of a motor vehicle), and a bypass or lockup clutch disposed in the housing and arranged to transmit (when necessary) torque between the housing and the turbine. The bypass clutch is of the type having fully engaged and fully disengaged conditions as well as a plurality (e.g., an infinite number) of partially engaged conditions. The clutch includes at least one first friction surface (e.g., on a portion of the housing) and a substantially washer-shaped friction lining having at least one second friction surface which contacts the at least one first friction surface in each of the partially engaged conditions as well as in the fully engaged condition of the clutch. The substantially washer-shaped friction lining can be provided on an axially movable piston in the housing and has radially inner and radially outer marginal portions. The (at least one second) friction surface of the friction lining has at least one elongated fluid conveying channel including an inlet at one of the radially inner and outer marginal portions and an outlet at the other of the radially inner and outer marginal portions to convey a stream of fluid in a direction from the inlet to the outlet. In accordance with a feature of the invention, at least a major part of the channel has an at least substantially constant width as seen transversely of the direction of fluid flow therein.

The inlet of the at least one channel is or can be disposed at the radially outer marginal portion of the friction lining.

The torque converter can further comprise an (optional) stator which, if provided, is installed in the housing between the pump and the turbine.

The at least one channel can be provided with at least two bends which serve to change the direction of fluid flow between the inlet and the outlet of the at least one channel. Successive increments of the fluid stream flowing toward and from each of the at least two bends have first and second components of flow; one of these components can extend substantially radially of the friction lining from one of the inner and outer marginal portions toward the other of such marginal portions, and the other component then extends substantially radially of the friction lining from the other marginal portion toward the one marginal portion. The at least one channel is preferably provided with more than two bends, for example, with between two and twelve bends and most preferably with between four and ten bends.

At least one of the bends can be configured and dimensioned to alter the direction of flow of successive increments of the fluid stream through an angle of between 90° and 180°; a presently preferred angle is between 120° and 170°, particularly between 130° and 150°.

It is presently preferred to impart to the at least one channel a shape such that it includes an at least substantially straight portion between the at least two bends. Such at least substantially straight portion and a radius extending from the axis of the housing across one of the at least two bends preferably make an angle of between 0° and 50°, particularly between 15° and 45°.

The depth of the at least one channel is or can be a relatively small fraction of the at least substantially constant width, for example, less than 10 percent (and preferably less than five persent) of the width.

The at least one second friction surface can be provided with at least one recess adjacent the radially inner or the radially outer marginal portion. For example, such friction surface can be provided with a first row of spaced-apart (triangular and/or otherwise configured) recesses adjacent the inner marginal portion and with a second row of spaced-apart recesses along the outer marginal portion of the friction lining. Each such recess can be separated from the at least one channel by a portion of the at least one second friction surface. The depth of the at least one channel can match or exceed or be less than the depth of the at least one recess.

The ratio of that (first) portion of the at least one second friction surface which is provided with one or more recesses and/or with one or more channels to that (second) portion of such at least one second friction surface which is devoid of channels and/or recesses can be between 3 and 0.33, preferably between 2.33 and 0.43 and most preferably between 1.5 and 0.66.

Since the at least one channel is provided with one or more bends or other mutually inclined portions, its overall length (between the inlet and the outlet) exceeds (e.g., 1.5 times or twice) its length as measured in the circumferential direction of the friction lining (i.e., the shortest distance as measured clockwise or counterclockwise from the inlet to the outlet of the at least one channel, or in the opposite direction, is less than the actual length of the at least one channel).

Furthermore, the distribution of one or more channels and (if provided) one or more recesses in the at least one second friction surface can be such that a radius extending from the axis of the housing and traversing the friction lining includes a first portion which traverses one or more recesses and/or one or more channels as well as a second portion traversing a part of the at least one second friction surface which is devoid of recesses and/or channels. The second portion of such radius preferably has a length which is between 0.5 times and twice (most preferably between 0.7 and 1.5 times) the length of the first portion.

At least one of the friction surfaces can have an undulate shape, and such undulate shape can be modulated in the circumferential direction of the friction lining. For example, the undulate friction surface can have undulations with an amplitude of between 0.005 mm and 1 mm, preferably between 0.1 mm and 0.75 mm. Still further, at least one of the friction surfaces (e.g., the friction surface exhibiting an undulate shape) can have a finish other than a precision finish. Thus, such non-precision finished surface need not be treated by a precision grinding, polishing or other finishing tool but can exhibit a certain degree of roughness.

Another feature of the invention resides in the provision of a hydrokinetic torque converter which comprises a rotary housing, a pump in the housing, a turbine which is disposed in and is rotatable with and relative to the housing about a common axis, and a bypass clutch which is installed in the housing and serves to transmit torque between the housing or pump and the turbine. The bypass clutch has fully engaged and fully disengaged conditions as well as a plurality of partially engaged conditions and includes a first friction surface and a substantially washer-shaped friction lining having at least one second friction surface contacting the at least one first friction surface in each of the partly engaged conditions and in the fully engaged condition of the bypass clutch. At least one of the friction surfaces has an undulate shape. The undulate shape of the at least one friction surface can be modulated in a circumferential direction of the friction lining. For example, the undulate friction surface can have undulations with an amplitude of between 0.005 mm and 1 mm, preferably between 0.1 mm and 0.75 mm. Still further, at least one of the friction surfaces (e.g., the friction surface having an undulate shape) can have a finish other than a precision finish, e.g., a finish other than involving precision grinding, polishing, nibbling or the like.

An additional feature of the invention resides in the provision of a hydrokinetic torque converter comprising a rotary housing designed to contain a supply of fluid (such as oil), a pump in the housing, a turbine disposed in and rotatable with as well as relative to the housing about a common axis, and a bypass clutch which is installed in the housing and serves to transmit torque between the housing and the turbine (either directly or by way of the pump). The clutch has fully engaged and fully disengaged conditions as well as a plurality of partially engaged conditions and includes at least one first friction surface and a substantially washer-shaped friction lining having at least one second friction surface which contacts the at least one first friction surface in each of the partially engaged conditions as well as in the fully engaged condition of the bypass clutch. The substantially washer-shaped friction lining has radially outer and radially inner marginal portions and the at least one second friction surface has a plurality of elongated fluid conveying channels each having an inlet at one of the marginal portions and an outlet at the other marginal portion. One of the channels serves to convey a stream of fluid from the inlet to the outlet of such channel in a first direction having a first component extending clockwise and circumferentially of the at least one friction lining, and another channel serves to convey a stream of fluid in a second direction having a second component extending counterclockwise and circumferentially of the friction lining.

Still another feature of the invention resides in the provision of a hydrokinetic torque converter comprising a rotary housing which is designed to contain a supply of a hydraulic fluid, a pump which is installed in and can be of one piece with the housing, a turbine which is disposed in and is rotatable with as well as relative to the housing about a common axis, and a bypass or lockup clutch installed in the housing and serving to transmit torque between the housing and the turbine (either directly or by way of at least one damper and/or by way of the pump). The clutch has fully engaged and fully disengaged conditions as well as a plurality (such as an infinite number) of partially engaged conditions and includes at least one first substantially annular friction surface and at least one second at least substantially annular friction surface (one of these friction surfaces can be provided on a substantially washer-shaped friction lining) which contacts the at least one first friction surface in each of the partially engaged conditions as well as in the fully engaged condition of the bypass clutch. At least one of the friction surfaces is provided with at least two fluid conveying channels each having an inlet at the radially inner or at the radially outer marginal portion and an outlet at the radially outer or radially inner marginal portion of the at least one friction surface. Each of the at least two channels includes two sections extending substantially circumferentially of the friction surfaces. One of the sections extends clockwise and the other section extends counterclockwise as seen in the circumferential direction of the friction surfaces.

The novel features which are considered as characteristic of the invention are set forth in particular in the appended claims. The improved hydrokinetic torque converter and its bypass clutch themselves, however, both as to their construction and the mode of assembling, installing and operating the same, together with numerous additional important and advantageous features thereof, will be best understood upon perusal of the following detailed description of certain presently preferred specific embodiments with reference to the accompanying drawings.

BRIEF DESCRIPTION OF THE DRAWINGS

FIG. 2b illustrates a detail of the friction lining which is shown in FIGS. 2 and 2a;

DESCRIPTION OF PREFERRED EMBODIMENTS

Figure 1:
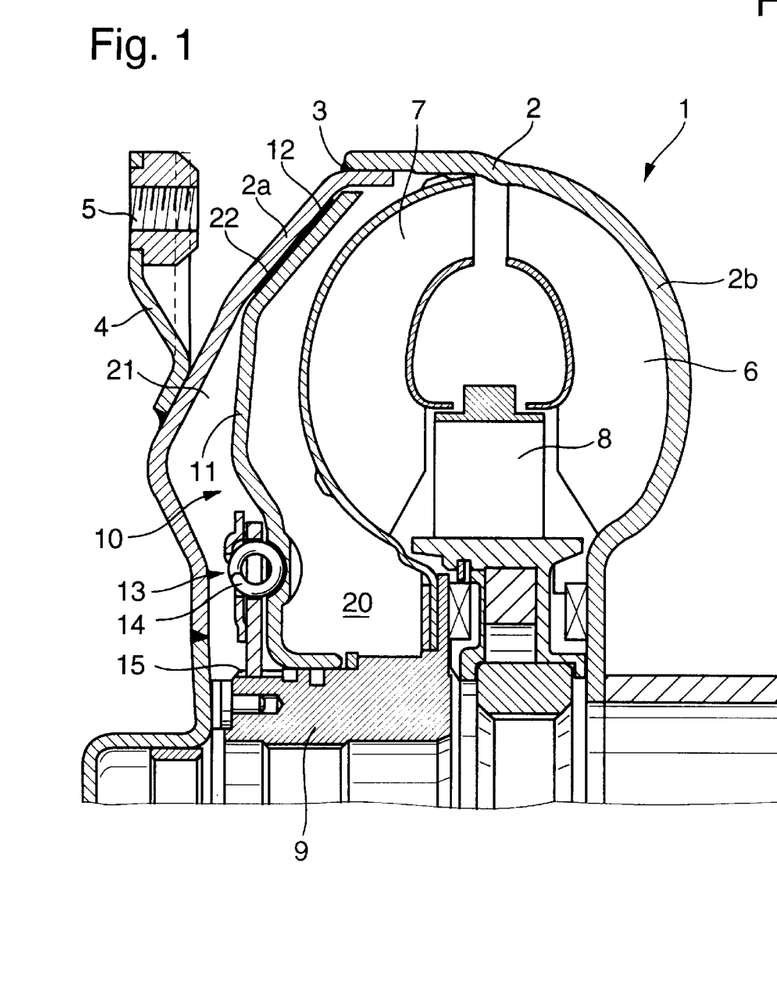
FIG. 1 is a fragmentary axial sectional view of a hydrokinetic torque converter with a bypass clutch which can embody the invention.

FIG. 1 shows a hydrokinetic torque converter 1 which comprises a housing 2 including two sections 2a, 2b which are welded or otherwise (preferably) sealingly secured to each other, as at 3. The section 2a can be affixed to a rotary output element of a prime mover (e.g., to the camshaft or the crankshaft of an internal combustion engine, not shown) by a substantially disc-shaped connector 4 having holes 5 for bolts or other suitable fasteners (not shown). The section 2b of the housing 2 is normally adjacent a gearbox (not shown) having an input shaft which can receive torque from the hub 9 of a turbine 7 rotatably mounted in the housing 2 between a bypass clutch or lockup clutch 10 and an optional stator 8. The latter is installed in the housing 2 between the turbine 7 and a pump 6 having vanes which can be of one piece with the housing section 2b. The turbine 7 can rotate with as well as relative to the housing 2 about a common axis which coincides with the axes of the output element of the engine and the input element of the gearbox when the improved torque converter 1 is utilized in the power train of a motor vehicle to transmit torque between the engine and the gearbox.

The connector 4 and/or that part (e.g., a flexible plate) of the torque transmitting means which secures the connector 4 to the output element of the prime mover can exhibit a certain amount of flexibility. The torque converter 1 of FIG. 1 can constitute a preassembled unit or module which is ready to be affixed to the prime mover by fasteners to be introduced (or already extending) into the holes 5 of the connector 4.

The connection between the turbine 7 and the gearbox can comprise external teeth provided on the input shaft of the gearbox and mating with internal teeth of the hub 9.

Figure 1A:
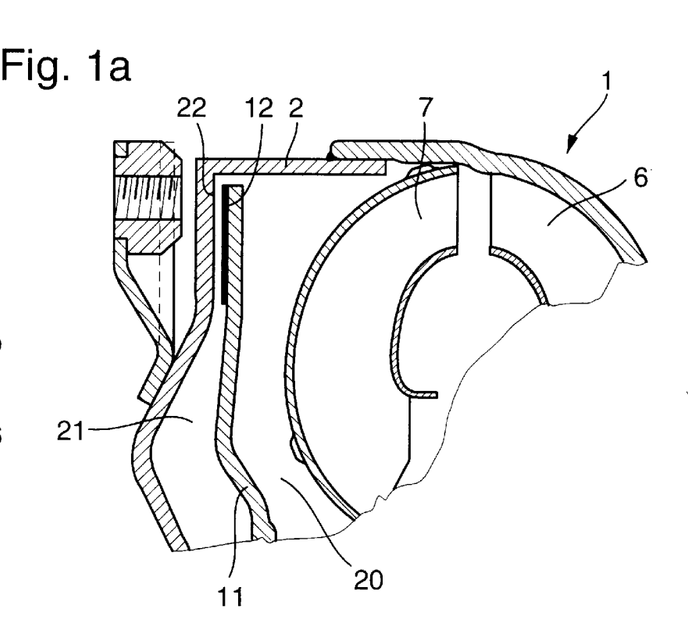
FIG. 1a is an enlarged fragmentary axial sectional view of a hydrokinetic torque converter having a bypass clutch constituting a modification of the clutch which is shown in FIG. 1.

The bypass clutch 10 (see also FIG. 1a) comprises a clutch plate in the form of a piston 11 which is movable in an internal chamber or space of the housing 2 in the directions of the common axis of the housing 2 and the turbine 7 into and from engagement with a frustoconical friction surface 22 at the inner side of the housing section 2a. That (frustoconical) side of the piston 11 which confronts the housing section 2a carries a friction lining 12 having an exposed friction surface (see the friction surface 103 of the friction lining 100 shown in FIGS. 2 and 2a) which can be moved into engagement with the friction surface 22 to thus engage the bypass clutch 10, either fully (i.e., without any slip between the piston 11 and the housing section 2a) or in part (namely with a desired degree of slip). FIG. 1a shows the bypass clutch in the fully disengaged condition, i.e., the exposed friction surface of the friction lining 12 is out of contact with the friction surface 22 of the housing section 2a.

The condition of the bypass clutch 10 can be changed by hydraulic means. Thus, the piston 11 divides the fluid-filled or fluid-containing internal space or chamber of the housing 2 into a pair of compartments or plenum chambers 20 and 21. When the pressure of fluid in the compartment 20 between the piston 11 and the turbine 7 rises above that in the compartment 21 between the-piston 11 and the housing section 2a, the piston is caused to move the exposed surface of its friction lining 12 into a desired frictional contact with the friction surface 22, depending upon whether the bypass clutch 10 is to operate without any slip or with a desired degree of slip. Inversely, if the extent of frictional engagement between the housing section 2a and the friction lining 12 is to be reduced (or if such engagement or contact is to be terminated so that the bypass clutch 10 becomes completely disengaged), the fluid pressure in the compartment 21 is caused to rise above that in the compartment 20 so that the piston 11 moves axially and away from the housing section 2a. The manner in which the fluid pressure in the compartments 20, 21 can be regulated is not shown because it is well known and forms no part of the present invention.

The torque transmitting connection between the radially inner portion of the piston 11 and the hub 9 of the turbine 7 (such connection is operative when the bypass clutch 10 is at least partially engaged) includes a torsional vibration damper 13 with energy storing elements 14 (e.g., coil springs acting in the circumferential direction of the piston 11). The piston 11 is movable axially of the hub 9 but the output element of the damper 13 is non-rotatably secured to the hub 9 by a pair of meshing gears (as at 15). The output element of the damper 13 can perform certain limited angular movements relative to the piston 11 of the bypass clutch 10. Reference may be had to the commonly owned U.S. Pat. No. 5,377,796 (granted Jan. 3, 1995 to Oswald Friedmann and Johann Jäckel for "APPARATUS FOR TRANSMITTING FORCE BETWEEN ROTARY DRIVING AND DRIVEN UNITS") which discloses several combined torque transmitting and torsional vibration damping or absorbing connections between the piston of a bypass clutch and the turbine of a hydrokinetic torque converter.

The provision of a frustoconical friction lining 12 and of a frustoconical friction surface 22 is optional. Reference may be had to FIG. 1a which shows that the piston 11, its friction lining 12 and the friction surface 22 of the housing section 2a are located in planes extending at right angles to the axis of the turbine 7. Furthermore, it is equally possible to provide a friction lining on the housing section 2a in addition to or in lieu of the illustrated friction lining 12 on the piston 11. It is even possible to employ a bypass clutch which is devoid of friction linings. The friction linings 12 which are shown in FIGS. 1 and 1a have a substantially washer-shaped configuration and, when they are not in frictional engagement with the adjacent friction surfaces 12, they provide a path for the flow of a fluid (such as oil) between the compartments 20 and 21 of the internal chamber defined by the housing 2.

Figure 6:
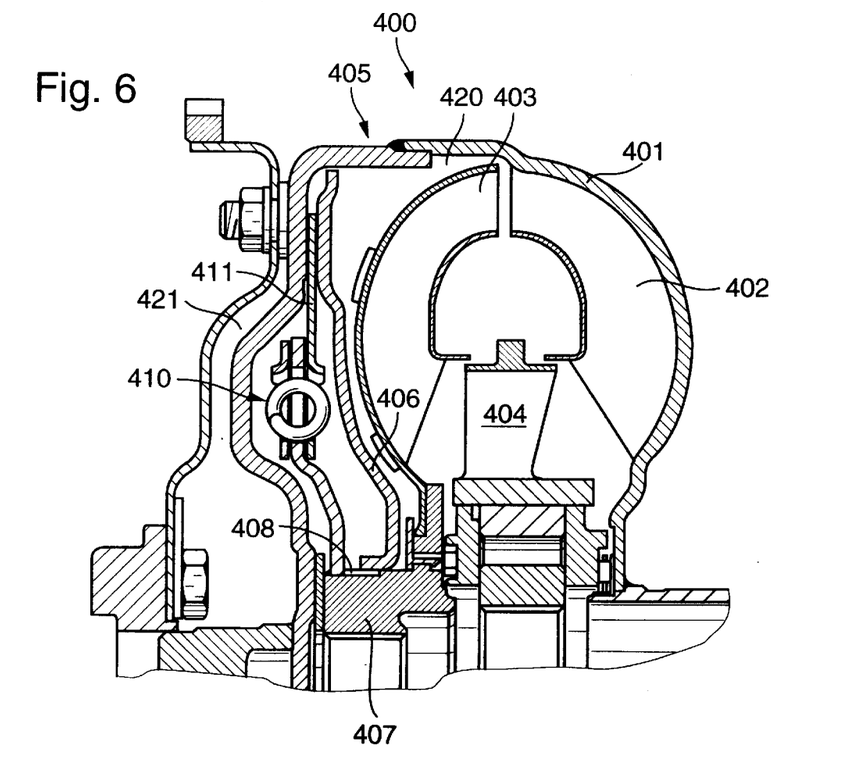
FIG. 6 is a fragmentary axial sectional view of a hydrokinetic torque converter having a bypass clutch with a plurality of clutch plates.

The bypass clutches 10 which are shown in FIGS. 1 and 1a are rather simple in that each of these clutches comprises a single clutch plate in the form of a piston 11. However, the invention can be embodied with equal advantage in bypass clutches having sets of two or more clutch plates (one such bypass clutch is shown in FIG. 6, as at 405). Still further, the bypass clutch can be installed between the turbine and the pump of a hydrokinetic torque converter (rather than directly between the housing and the turbine).

Figure 2:
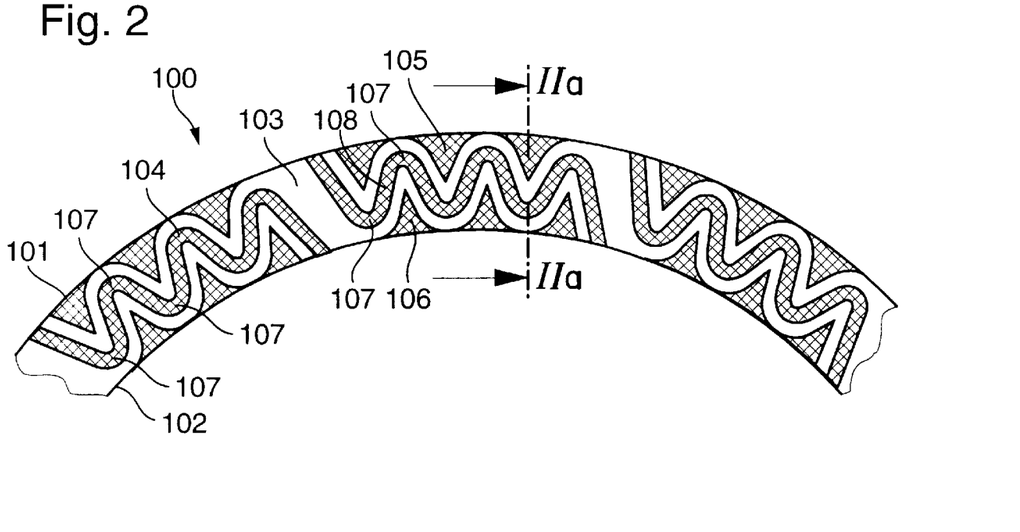
FIG. 2 is a fragmentary plan view of a friction lining which can be utilized in the improved bypass clutch and is provided with one presently preferred array of channels and pockets machined into or otherwise formed in its friction surface.

FIG. 2 shows a portion of a washer-shaped friction lining 100 having a radially outer marginal portion 101 and a radially inner marginal portion 102. This friction lining can be flat (as the friction lining 12 in the bypass clutch of FIG. 1a), or it can have a frustoconical shape (as the friction lining 12 on the piston 11 of the bypass clutch 10 shown in FIG. 1). Furthermore, the marginal portion 101 and/or 102 need not be truly circular, i.e., it can have an oval or a polygonal shape without departing from the spirit of the invention. Still further, the friction lining 100 of FIG. 2 can be affixed (e.g., bonded) to a piston or to a housing section in such a way that its center is not located on the axis of the housing of the torque converter; this modification can be resorted to regardless of whether the marginal portion 101 and/or 102 of the friction lining 100 has a circular, oval or other (such as polygonal) outline. In other words, the center of gravity or the geometric center of the friction lining 100 may but need not be located on the rotational axis of the part (such as the piston 11 or the housing section 2a) which carries the friction lining.

The friction surface 103 of the friction lining 100 (i.e., that surface which can be moved into maximum or less than maximum frictional contact with the friction surface 22 if the friction lining 100 is utilized instead of the friction lining 12 shown in FIG. 1 or 1a) is provided with a novel array of fluid-receiving and fluid-conveying depressions or cutouts including elongated channels or grooves 104 (three such channels can be seen in the friction lining portion shown in FIG. 2). The depressions or cutouts (depending upon the mode of making them) further include an annular set or row of substantially triangular recesses or pockets 105 extending radially inwardly from the outer marginal portion 101, and an annulus of substantially triangular recesses or grooves 106 extending radially outwardly from the inner marginal portion 102. The channels 104 have inlets at the radially outer marginal portion 101 and outlets at the radially inner marginal portion 102. Furthermore, each of the channels 104 is provided with at least two longitudinally spaced-apart bends 107 which change the direction of flow of successive increments of the fluid streams flowing from the inlets toward and beyond the outlets of the respective channels. These channels and the adjacent recesses 105, 106 are separated from each other by plane (non-depressed) portions of the friction surface 103 of the friction lining 100.

Successive neighboring bends 107 of the channels 104 are connected to each other by straight or at least substantially straight elongated portions or sections 108 of the respective channels.

The channels 104 enable a certain quantity of fluid (coolant) to flow between the compartments 20, 21 even in the fully engaged condition of a bypass clutch employing the friction lining 100 of FIG. 2. This enables the fluid to withdraw some heat from that portion of the bypass clutch which is most likely or at least highly likely to undergo pronounced heating, particularly when the bypass clutch is partially engaged so that the friction surface 103 of the friction lining 100 and the complementary friction surface (such as the surface 22 in FIG. 1 or 1a) can slip relative to each other. As a rule, the temperature of fluid at least in the compartment 20 is less (or considerably less) than the temperature of the piston 11 or housing section 2a (at least when the bypass clutch operates with slip) so that the fluid streams flowing in the channels 104 can withdraw considerable amounts of friction heat with attendant lengthening of the useful life of the friction lining 100 and of the entire bypass clutch. The fluid thus flowing from the compartment 20 into the compartment 21 can be caused to flow through a heat exchanger (not shown) to be relieved of at least some heat prior to being recirculated into the housing 2 and its compartment 20.

The extent to which the recesses 105, 106 extend from the respective marginal portions 101, 102 toward the central zone of the friction surface 103 can vary within a wide range. The same applies for the dimensions and/or the configuration of such recesses. All of the recesses 105 and/or 106 may but need not be identical. Still further, it is possible to provide the friction surface 103 with recesses which are depressed and/or cut into the friction surface in addition to or instead of the recesses 105, 106 and extend all the way between the marginal portions 101, 102. Thus, such modified or additional recesses can constitute channels or grooves which establish paths for the flow of fluid coolant substantially radially of the friction lining 100 all the way between the marginal portions 101 and 102. Still further, it is possible to design at least some of the recesses 105, 106 in the form of pools which are completely surrounded by untouched (non-depressed or non-removed) portions of the friction surface 103.

In accordance with a presently preferred feature of the invention, the width of the channels 104 is at least substantially constant at least substantially all the way from their inlets at one of the marginal portions 101, 102 to their outlets at the other of these marginal portions. Otherwise stated, the width of the channels 104 is at least substantially constant as measured transversely of the direction of fluid flow therein.

An important advantage of channels having an at least substantially constant or non-varying width is that, particularly if the depth of such channels is also at least substantially constant, the flow of fluid coolant in such channels is highly predictable (uniform). Thus, the speed of the fluid streams is constant or practically constant in each portion of the cross-sectional area of each channel 104, and the development of turbulences (such as eddy currents) is highly unlikely. This, too, contributes to a more predictable cooling action of the fluid streams in the channels 104.

A comparison of fluid flow in the just described channels 104 with that in an irregularly shaped channel whose cross-sectional area varies in different longitudinally spaced-apart portions of the irregularly shaped channel reveals that the flow of fluid in such irregularly shaped channel is highly unpredictable because this channel includes sections wherein the fluid is stagnant as well as sections werein the fluid flows at widely different rates. For example, the flow of a fluid stream in a channel having successive sections of different widths can be so unpredictable that the fluid is not in motion at all in certain (such as wider) sections of the channel with attendant unpredictability of the cooling or heat-withdrawing action and resulting premature damage to or destruction of the bypass clutch.

Another drawback of channels having a varying width and/or depth is that such channels are likely to gather highly undesirable accumulations of solid matter (such as fragments of friction linings) which interfere with the flow of fluid, which interfere with a predictable flow of fluid, and which act as thermal insulating layers impeding the exchange of heat between the fluid in such channels and the adjacent material of the friction lining, piston, housing section or any other part which is provided with such unsatisfactory channels.

Referring again to FIG. 2, it will be seen that the width of the channels 104 in the regions of their bends 107 is or can be the same or practically the same as the width of the straight sections or portions 108 between neighboring bends 107 and the width of straight sections leading from the inlet to the first bend and from the last bend to the outlet of a channel.

It has been found that the heat-withdrawing action of a fluid stream in a channel (such as 104) is highly satisfactory if the channel is provided with several bends, namely with at least two and up to twelve bends. A presently preferred number of bends 107 per channel 104 is between four and ten, particularly between six and eight (each of the channels 104 in the friction surface 103 of the friction lining 100 of FIG. 2 has six bends 107).

The channels 104 of FIG. 2 (with at least substantially straight intermediate portions or sections 108 between neighboring bends 107) can be modified by replacing the sections 108 with arcuate sections, particularly with arcuate sections having radii of curvature greater than those of the bends 107. For example, the straight section which is denoted by the character 108 and forms part of the median channel 104 in that portion of the friction lining 100 which is shown in FIG. 2 can be replaced with an arcuate section bounded by a concave edge at its left-hand side and by a convert edge at its right-hand side. The immediately following section (as seen in the direction of fluid flow in the median channel 104 of FIG. 2) can be curved in the opposite direction, the next-following section can be curved again in the same manner as the referenced section 108, and so forth.

If the inlets of the channels 104 are provided at the radially outer marginal portions 101 of the friction lining 100 which is shown in FIG. 2, the fluid streams which enter such channels flow in a clockwise direction (as viewed in FIG. 2). The fluid streams will flow in a counterclockwise direction if the inlets of the channels 104 are located at the radially inner marginal portion 102 or if the orientation of the illustrated channels 104 is inverted so that their inlets (at the marginal portion 101) are located to the right of the respective outlets (at the radially inner marginal portion 102).

The bends 107 do not alter the direction of fluid flow, be it clockwise or counterclockwise, but merely influence the mutual inclination of fluid flows in successive (straight of intermediate) sections 108. As used herein, the terms "clockwise" and "counterclockwise" are indicative of the directions of fluid flow when looking at the channeled and recessed friction surface 103 of a friction lining 100 in a manner as represented in FIG. 2. Thus, these terms are not intended to indicate the direction of rotation of the output element of a prime mover which rotates the housing of the improved torque converter, or a direction counter to such direction of rotation. Otherwise stated, the terms "clockwise" and "counterclockwise" are to be interpreted as indicating the direction of fluid flow in channels which are shown in a view corresponding to that of the channels 104 shown in FIG. 2.

Each of the illustrated bends 107 is designed to change the direction of fluid flow in the respective channel 104 in such a way that the flow in the straight section 108 preceding a bend 107 has a component extending radially of the friction lining 100 from one of the marginal portions 101, 102 toward the other of these marginal portions, and that the flow in the straight section 108 following the same bend 107 has a component extending radially of the friction lining 100 from the other toward the one marginal portion. Otherwise stated, the fluid in a section 108 preceding a bend 107 can flow substantially radially inwardly or outwardly, and the fluid in the section 108 following such bend 107 then flows substantially radially outwardly or inwardly, i.e., in a direction counter to that ahead of the bend 107.

Figure 5:
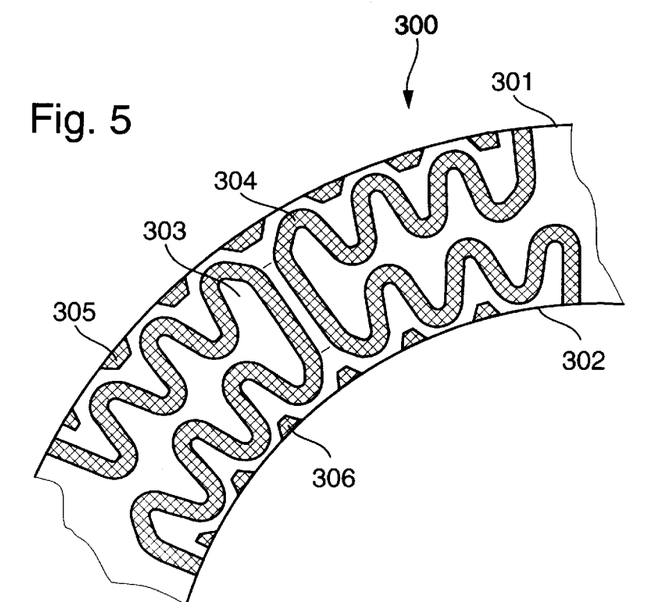
FIG. 5 is a view similar to that of FIG. 2, 3 or 4 but showing still another array of pockets and channels in the friction surface of the friction lining.

It is also possible to design the channels in the friction surface (such as 22 or 103) in such a way that they greatly influence (for example, that they reverse) the direction of fluid flow in the respective channel. Reference may be had to the channels 304 which are shown in FIG. 5. Still further, it is possible to provide a friction surface with several channels wherein the fluid streams flow in opposite directions. For example, the inlet (at the radially outer marginal portion 101) of the median channel 104 shown in FIG. 2 can be located to the right of the outlet (at the radially inner marginal portion 102). The flow of fluid in the two outer channels 104 of FIG. 2 then takes place in a clockwise direction but the median channel (if modified as proposed above) is designed to convey a fluid stream in a counterclockwise direction. This will be explained again with reference to FIG. 3.

Figure 2A:
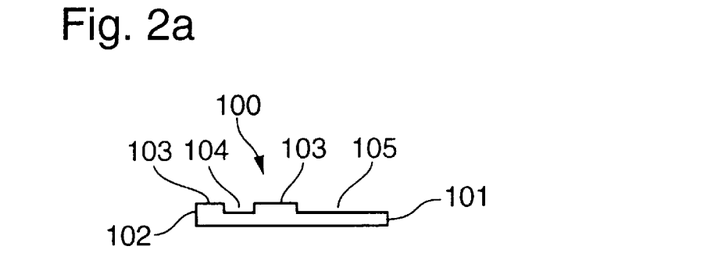
FIG. 2a is an enlarged radial sectional view of the friction lining substantially as seen in the direction of arrows from the line IIa—IIa in FIG. 2.

FIG. 2a shows that the depth of the channel 104 which is illustrated therein matches or at least approximates the depth of the recess 105. The depth of each recess 106 can but need not be the same as that of the recesses 105. The sectional view of FIG. 2a along the line IIa—IIa in FIG. 2 is not or need not be to scale. For example, the width of the channel 104 is or can be at least ten times (or even at least twenty times) its depth. However, FIG. 2a does show a presently preferred embodiment of the friction lining 100 and its friction surface 103, namely depth of each channel 104 and the depth of each recess 105 (as well as 106) is or can be at least substantially constant across the full width of such channel or recess.

The depth of the recesses 105 can match or it can be less than or can exceed the depth of the channels 104 and/or the depth of the recesses 106. The exact depths of the illustrated depressions or cutouts (104, 105, 106) in the friction surface 103 will (or can) depend on the desired cooling effect upon the friction lining 100 and/or upon the part (e.g., a housing section) having a friction surface which is contacted by the friction surface 103 when the bypass clutch employing the friction lining 100 is at least partially engaged.

Figure 2B:
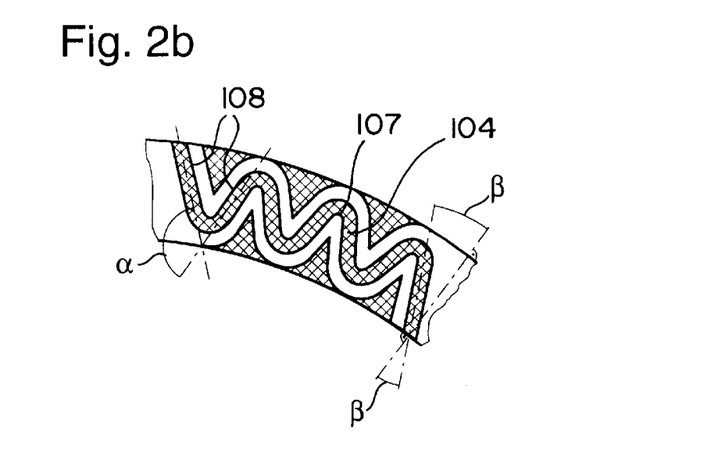

The angle α between two successive straight sections 108 of the channel 104 shown in FIG. 2b is an oblique angle. This angle denotes the extent to which a bend 107 can change the direction of fluid flow between two successive straight sections 108. It is presently preferred to select an angle α which is between 90° and 180°, particularly between 120° and 170°, especially between 130° and 150°.

The angle β is enclosed by a section 108 with a radius extending from the center or axis of the friction lining 100 and torque converter housing and halving the bend 107. This angle β can be between 0° and 50°, preferably between 15° and 45°.

Regardless of whether the friction surface (such as the friction surface 103 shown in FIGS. 2, 2a and 2b) is provided only with channels (104), with channels and one row of recesses (105 or 106), or with channels and several sets or rows of recesses (as actually shown in FIG. 2), the ratio of the area of the non-channeled or non-channeled and non-recessed portion of the friction surface to theof the area entire friction surface is preferably between 40% and 70%, particularly between 50% and 60%.

Figure 3:
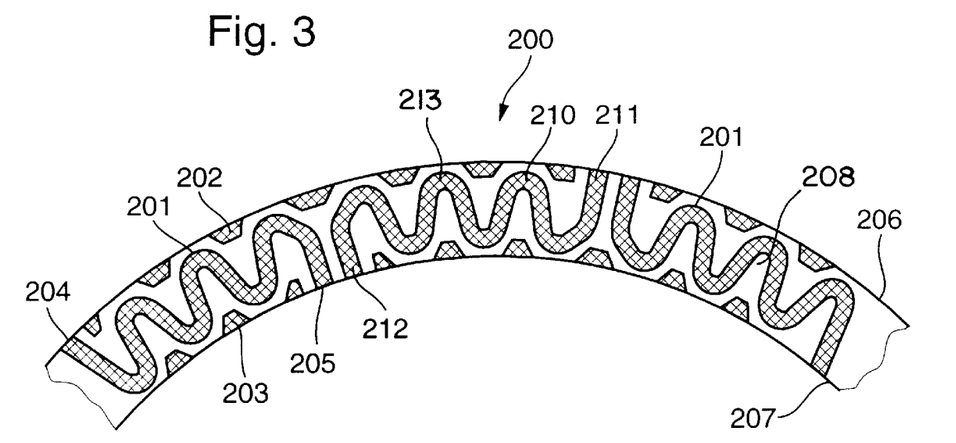
FIG. 3 is a fragmentary plan view similar to that of FIG. 2 but showing a different array of pockets and channels in the friction surface of the friction lining.

FIG. 3 shows a portion of a washer-shaped (e.g., truly annular) friction lining 200 having a radially outer marginal portion 206 and a radially inner marginal portion 207, and a friction surface 208 with several meandering channels 201, 210 with inlets 204, 211 in the marginal portion 206 and with outlets (205, 212) in the marginal portion 207, an outer row or set of recesses 202 at the marginal portion 206, and an inner row or set of recesses 203 at the marginal portion 207. The flow of fluid streams in the channels 201, 210 can be reversed, i.e., in directions from 205, 212 toward 204, 211, respectively.

The fluid streams which enter the channels 201 at the respective inlets 204 flow clockwise toward and beyond the respective outlets 205. On the other hand, the fluid stream entering the inlet 211 of the median channel 210 of FIG. 3 flows counterclockwise toward and beyond the outlet 212. Each of the channels 201, 210 has several bends 213 (all of which are not identical) and several substantially straight portions or sections between successive neighboring bends. The width of the channels 201, 210 is constant, and the recesses 202, 203 have a substantially trapezoidal configuration.

Figure 4:
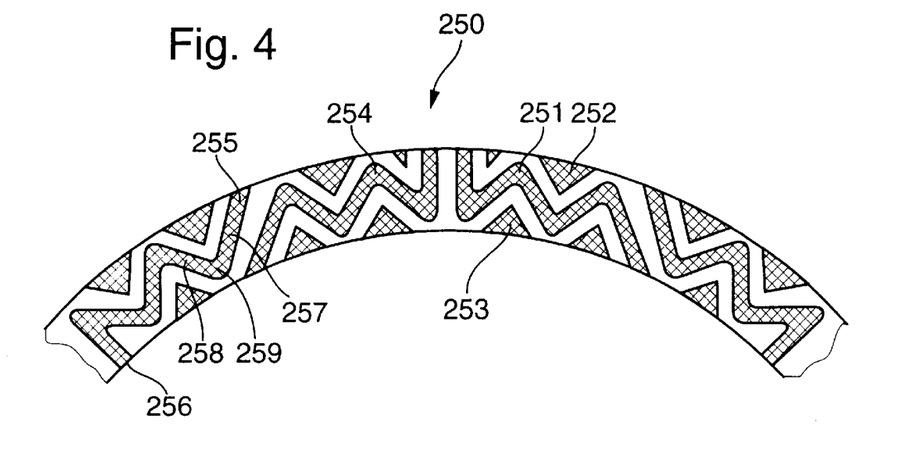
FIG. 4 is a view similar to that of FIG. 2 or 3 but showing a further array of pockets and channels in the friction surface of the friction lining.

FIG. 4 shows a portion of a friction lining 250 having a friction surface provided with channels 251, 254, with a row of recesses or pockets 252 along the outer marginal portion, and a row or series of recesses or pockets 253 along the inner marginal portion of the friction lining. The inlets 255 of the two right-hand channels 251 are located at the outer marginal portion, and the fluid streams entering these channels flow in a clockwise direction. The two left-hand channels 254 serve to convey fluid streams in a counterclockwise direction from the respective inlets 255 to the respective outlets 256.

A difference between the channels 251, 254 and the prevously described channels 104, 201 and 210 is that the bends 259 between the straight sections 257, 258 of the channels 254 shown in FIG. 4 are sharper or more pronounced, i.e., instead of being substantially U-shaped (see, for example, the bends 107), the bends 259 are clearly or more pronouncedly V-shaped. Therefore, the width of the channels 251, 254 varies and is greater at the bends 259 than at the straight sections 257, 258.

It will be seen that the heretofore described channels do not have any branches. This can contribute to a more satisfactory and more uniform cooling action, especially if the width of the entire channel (such as 201 or 210) is constant all the way from the inlet (204) to the outlet (205), i.e., if the bends (213) are also configurated in such a way that they do not contribute to a widening or narrowing of the respective portions of the channels. As already mentioned above, the width of the channels 251 which are shown in FIG. 4 increases somewhat at the V-shaped bends 259. The embodiments which are shown in FIGS. 3 and 4 share the advantage that some of their channels convey fluid streams clockwise and the other channels convey fluid streams in a counterclockwise direction. This further enhances the intensity as well as the uniformity and predictability of the cooling action.

FIG. 5 illustrates a portion of a further friction lining 300 which has a friction surface 303 with channels or grooves 304, with recesses or pockets 305 at the radially outer marginal portion 301, and with recesses or pockets 306 at the radially inner marginal portion 302. Each of the channels 304 has an inlet at one of the marginal portions 301, 302 and an outlet at the other of these marginal portions. The configuration of the channels 304 is such that each thereof includes a stretch extending in a clockwise direction and a stretch extending in a counterclockwise direction. In addition, the left-hand channel 304 has a radially outer stretch extending clockwise (from its inlet at the outer marginal portion 301) and a radially inner stretch extending counterclockwise (toward its outlet at the radially inner marginal portion 302); on the other hand, the radially outer stretch of the right-hand channel 304 extends counterclockwise and the radially inner stretch of this channel extends in a clockwise direction.

Referring to FIG. 6, there is shown a portion of a hydrokinetic torque converter 400 having a housing 401, a pump 402 in the housing, a turbine 403 in the housing, and an optional stator 404 between the pump 402 and the turbine 403. The bypass clutch or lockup clutch 405 comprises an axially movable clutch plate or piston 406 which surrounds and is movable axially along the hub 407 of the turbine 403 and surrounds a sealing element 408 which is shown as being recessed into the peripheral surface of the hub 407. The sealing element 408 provides a barrier against undesirable flow of fluid between the compartments 420, 421 at the opposite sides of the piston 406.

The bypass clutch 405 further comprises a radially extending washer-like carrier or intermediate clutch plate 411 for two friction linings. A damper 410 is installed between that (radially outer input) portion of the carrier 411 which mounts the two friction linings and that (radially inner output) portion of the carrier which axially movably surrounds but cannot rotate relative to the hub 407 of the turbine 403. The input and output portions of the carrier 411 can turn relative to each other through an angle which is determined by the energy storing elements (e.g., coil springs) of the damper 410.

The illustrated damper 410 can be replaced with a so-called turbine damper, e.g., a damper of the type disclosed in German patent application Serial No. 19514411. The disclosure(s) of US patent(s) and/or allowed US patent application(s) corresponding to this German patent application is(are) incorporated herein by reference.

At least one of the friction linings on the carrier 411 is or can be configured in a manner as described with reference to FIGS. 2 to 6. One of these friction linings has a friction surface engageable with the friction surface of the adjacent radially extending section of the housing 401, and the other of these friction linings has a friction surface engageable with the confronting friction surface of the piston 406. It is further possible to provide friction linings on the radially extending section or the housing 401 and on the piston 406 in lieu of or in addition to the friction linings on the carrier 411.

Figure 7:
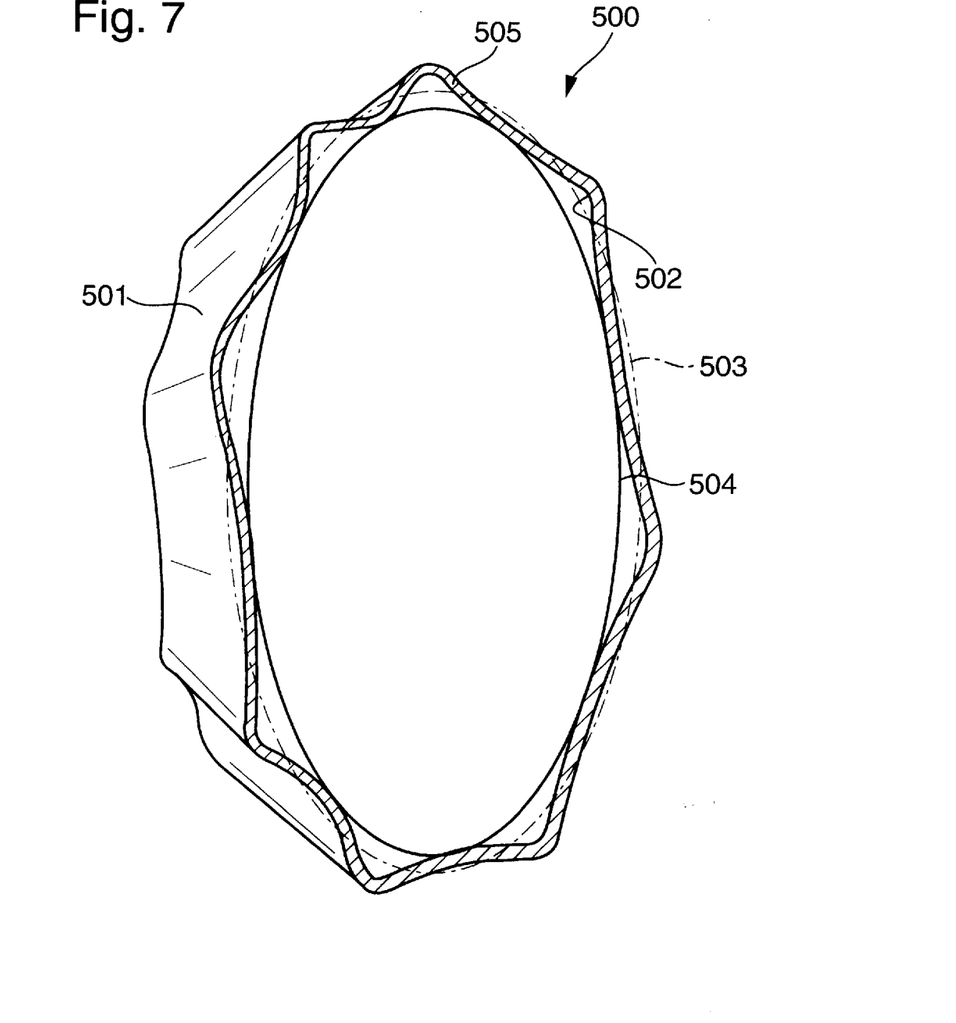
FIG. 7 is a perspective view of a portion of a bypass clutch or lockup clutch employing a component part having an undulate shape.

Referring to FIG. 7, there is shown a piston 500 forming part of a bypass clutch and having an undulate (corrugated) friction surface 501 arranged to contact a complementary friction surface on the section of a housing forming part of a hydrokinetic torque converter. Alternatively, the part denoted by the character 500 can constitute a housing section (e.g., corresponding to the housing section 2a in the hydrokinetic torque converter 1 of FIG. 1). The body 505 of the piston 500 does not have a truly circular outline, such as denoted by the dot-dash circle 503 which can also be said to represent the averaged circular outline of the friction surface 501. The solid-line circle 504 denotes the minimum diameter portion of the friction surface 501. The undulation is a modulation of the radius of the conical frustum as seen in a direction at right angles to the frustoconical surface and circumferentially of the piston 500. The character 502 denotes one of the undulations or corrugations.

Figure 7A:
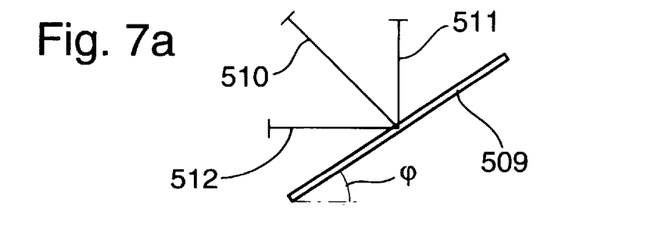
FIG. 7a is a diagram pertaining to the configuration of an undulate component part of a bypass clutch or lockup clutch.

In the diagram of FIG. 7a, 509 represents a portion of a conical piston in a sectional view, and the character 511 denotes the departure of the piston radius in a radial direction. i.e., roundness in accordance with the German Industrial Norm (DIN) 7184. The character 512 denotes the evenness or flatness as an indication of deviation in the axial direction and as seen circumferentially of the piston 509. The undulation 510 in the diagram of FIG. 7a amounts to the roundness multiplied by 1/cos of the cone angle ρ. Thus, the undulation can be said to denote the departure of the piston surface, housing surface, friction surface or complementary friction surface from an average radius as seen in a circumferential direction.

The undulation referred to in connection with the structures shown in FIGS. 7 and 7a should not be confused with the grooving or channeling of the friction surface of a friction lining, of the surface of a piston, of the surface of a housing section and/or of the surface of an intermediate clutch plate or carrier because the undulation is observable from both sides of an undulate body (such as at both sides of a friction lining) whereas the channel or channels and pockets or recesses (if any) are provided only in one side (i.e., in the friction surface) of a friction lining, piston, housing section and/or carrier.

The friction surface or surfaces of an undulate piston, housing section, friction lining and/or friction lining carrier need not be treated to a precision finish. In fact, it is often desirable to avoid a finish which is customarily achieved by resorting to a turning, grinding, polishing, nibbling or other typical surface smoothing or finishing treatment.

Furthermore, as used in the specification and in the claims, the term "modulated" or "modulation" denotes a variation or a variability of undulation as seen in a circumferential direction of the undulate part.

The modulation of undulation in a circumferential direction of the structures 500 and 509 shown in FIGS. 7 and 7a can also be described as denoting that portions of the friction surface (or of the friction lining having such friction surface) are caused to assume slightly different axial positions in dependency upon their angular positions. This means that all portions of an undulate friction surface do not simultaneously engage all adjacent portions of a complementary friction surface.

A precision finish (such as, for example, in a turning or polishing machine) of an undulate or corrugated friction surface (e.g., the surface 501 shown in FIG. 7) is or might not always be desirable because a precision finishing treatment could affect (reduce) the dimensions (unroundness) of the undulations.

For example, the undulations can be provided during the making of an undulate part (such as 500 or 509), e.g., in a deep drawing machine wherein sheet metal blanks are converted into housing sections, pistons or other carriers of friction linings or friction surfaces to be used in the improved bypass clutch. Thus, the configuration of the tools which are utilized in connection with the making of undulate or corrugated component parts of the improved bypass clutch can be selected in such a way that the tools necessarily provide the converted blanks with desirable undulations. Alternatively, or in addition to the utilization of such tools, the next-following heat treatment can be selected and carried out in such a way that it induces or further enhances the development of desirable undulations; this can be achieved by carrying out the heat treatment in such a way that it entails the development of internal stresses in selected portions of the workpieces and/or that it entails a reduction of the development or total elimination of internal stresses in certain portions of such workpieces. By way of example, a blank can be treated in a welding machine which applies selected and/or additional welded seams to thus guarantee the development of undulations or to further enhance the dimensions of undulations. The thus obtained or formed or developed undulations can remain intact by avoiding or by properly controlling a precision finishing treatment of the welded or otherwise undulated or corrugated workpieces.

Still further, it is possible to provide a workpiece with adequate undulations in an embossing, stamping or other suitable deforming or shaping machine for blanks of sheet metal or the like.

An advantage of the undulations in one or more component parts of the improved bypass clutch is that they contribute to more extensive (and hence much more satisfactory) contact between the fluid medium, the undulate part(s) and the part(s) adjacent the undulate part(s). For example, the cooling of a friction lining will be much more satisfactory if the friction lining is provided with one or more undulate friction surfaces.

Another advantage of the undulations is that an expensive (precision finishing) treatment of one or more friction surfaces can be avoided. This reduces the manufacturing cost and can even entail a simplification of assembly of the bypass clutch, of the incorporation of such clutch into the housing of a hydrokinetic torque converter, and/or the incorporation of the torque converter into a power train. Moreover, if at least one of the friction surfaces has an undulate shape and requires less expensive finishing treatment, this normally also applies for the complementary friction surface which cooperates with the undulate friction surface, i.e., this contributes to a further reduction of the cost of making bypass clutches which employ one or more undulate friction surfaces.

In each of the illustrated embodiments of the improved bypass clutch, the recesses and/or channels and/or other fluid-receiving configurations in the friction surfaces can be obtained as a result of deformation and/or as a result of removal of material from and/or as a result of application of additional material to selected friction surfaces.

Figures 8, 9, 10, 11:
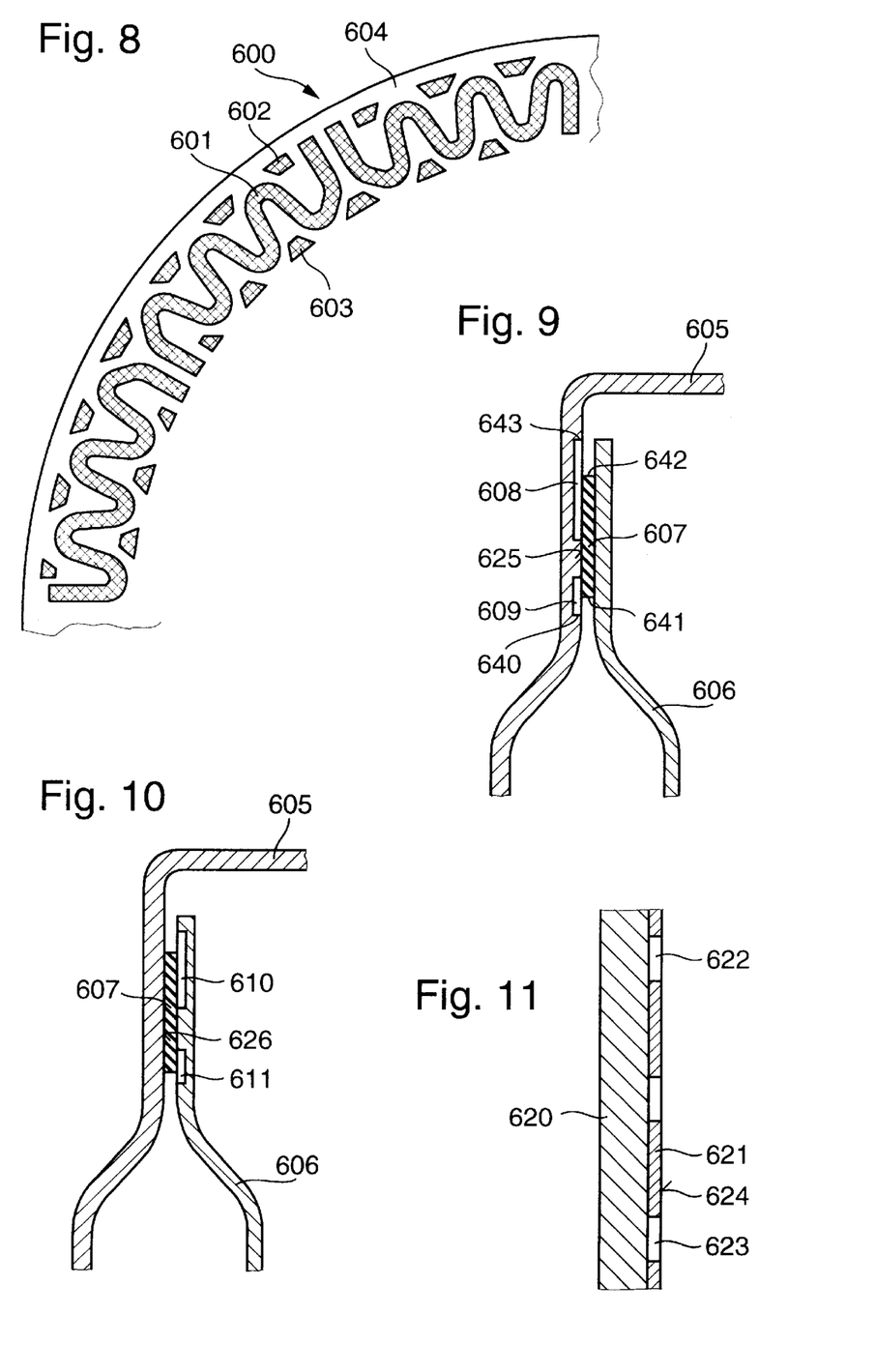
FIG. 8 is a fragmentary elevational view of the friction surface of a section of a housing forming part of a hydrokinetic torque converter and confining a bypass clutch which embodies the invention.
FIG. 9 is a fragmentary axial sectional view of a hydrokinetic torque converter having a housing section forming part of the bypass clutch and provided with a friction surface similar to that shown in FIG. 8.
FIG. 10 shows a modification of the structure which is illustrated in FIG. 9.
FIG. 11 is a fragmentary sectional view of another bypass clutch.

FIG. 8 shows that, in lieu of or in addition to providing recesses and/or channels in the friction surface of a friction lining, such recesses (602, 603) and/or channels (601) can be provided in the friction surface 604 of another component part of the improved bypass clutch, such as a section 600 of the housing of a hydrokinetic torque converter, a piston or an intermediate friction lining carrier.

Referring to FIG. 9, there is shown a portion of a hydrokinetic torque converter having a housing 605 and a bypass clutch including a piston 606 carrying a friction lining 607 which includes a radially outer marginal portion 642 and a radially inner marginal portion 641. The friction surface of the friction lining 607 is shown in at least partial frictional (torque transmitting) contact with the complementary friction surface 625 of the housing 605 (the latter can be made of a metallic sheet material, the same as the piston 606). The friction surface 625 has a radially outer marginal portion 643, a radially inner marginal portion 640, at least one channel 608, and at least one recess or pocket 609. The configuration and distribution of channels and recesses in the friction surface 625 can resemble or match that which is shown in FIG. 8 or in any other of the previously described friction surfaces.

FIG. 10 shows that a friction lining 607 can be bonded or otherwise affixed to the inner side of a radially extending section of the housing 605 of a hydrokinetic torque converter, and that a friction surface 626 complementary to that of the non-recessed and/or unchannelled friction surface of the friction lining 607 can be provided directly on the piston 606. The friction surface 626 has one or more channels 610 and one or more recesses or pockets 611. Such recesses and/or channels can be obtained by resorting to a stamping, embossing, milling, drawing, casting and/or other suitable treatment of the piston 606 of FIG. 10.

It is often desirable to select the dimensions of one friction surface in such a way that they exceed the radial dimensions of the neighboring (complementary) friction surface. This can be seen in FIGS. 9 and 10 wherein the radial dimensions of the friction surfaces 625 and 626 exceed the radial dimensions of the complementary friction surfaces (on the respective friction linings 607). Thus, and referring specifically to FIG. 9, the radially inner marginal portion 640 of the friction surface 625 at the inner side of the radially extending section of the housing 605 is located radially inwardly of the radially inner marginal portion 641 of the friction lining 607 on the piston 606, and the radially outer marginal portion 642 of this friction lining is located radially inwardly of the radially outer marginal portion 643 of the friction surface 625. This feature can be resorted to in each embodiment of the present invention.

FIG. 11 shows that a sheet metal piston 620 can carry a layer or film or panel 621 having an exposed friction surface 624 and being provided with suitable windows or openings constituting channels 622 and recesses or pockets 623. The windows or openings can be obtained by resorting to a cutting, stamping or any other suitable operation. It is not always necessary that the pockets or recesses 623 and/or the channels 622 constitute windows or openings which extend all the way through the layer 621. On the other hand, it is also possible (depending, for example, upon the thickness of the layer 621) to provide pockets or recesses 623 and/or channels 622 which extend all the way through the layer 621 and partially into the adjacent surface of the piston 620. The layer 621 can be welded, soldered, glued or otherwise bonded, stapled and/or otherwise affixed to the piston 620. The same procedure (i.e., using a layer 621) can be resorted to for the provision of recesses and/or channels on a composite housing section (such as 2a) or on a composite carrier (such as 411).

Figure 12:
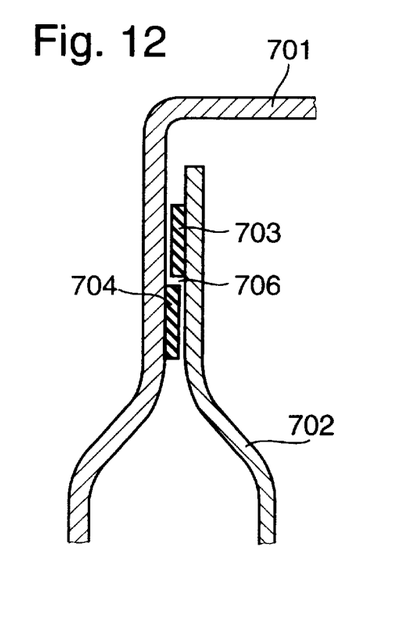
FIG. 12 is a fragmentary sectional view similar to that of FIG. 9 or 10 but showing still another bypass clutch.

FIG. 12 illustrates a portion of a hydrokinetic torque converter including a housing 701 and a bypass clutch which includes an axially movable piston 702 and embodies another form of the present invention. Thus, the friction lining between the piston 702 and the adjacent radially extending section of the housing 701 includes two substantially washer-shaped parts 703, 704 with a relatively narrow annular clearance or gap 706 between them. The part 703 is bonded or otherwise affixed to the piston 702 and its recessed and/or channelled friction surface is adjacent the confronting friction surface of the radially extending housing section. The part 704 is bonded or otherwise affixed to the radially extending housing section and its preferably recessed and/or channelled friction surface is adjacent the confronting friction surface of the piston 702 radially inwardly of the part 703.

It is clear that a composite friction lining can comprise three or more annular parts, e.g., two radially spaced-apart concentric parts on the piston 702 and a single annular part carried by the radially extending section of the housing 701 and located between the two concentric parts on the piston, or vice versa.

It is often preferred to distribute the annular parts of a composite friction lining in such a way that the part (or one of the parts) carried by the piston 702 (see the part 703 in FIG. 12) is located radially outwardly of the part or parts (such as 704) on the radially extending section of the housing 701. However, it is also possible to dimension the part (711 in FIG. 14) which is carried by the piston in such a way that it is located radially inwardly of the part or parts (710 in FIG. 14) carried by the housing section (or by a carrier, such as the carrier 411 shown in FIG. 6).

An advantage of the embodiment which is shown in FIG. 12 and of its equivalents (employing composite friction linings) is that the friction heat which is being withdrawn from the component parts of the bypass clutch is led away along a plurality of discrete paths. Thus, a first portion of such friction heat can be led away and dissipated by way of the housing 701, and a second portion of such friction heat can be led away and dissipated by way of the piston 702 shown in FIG. 12.

Figure 13:
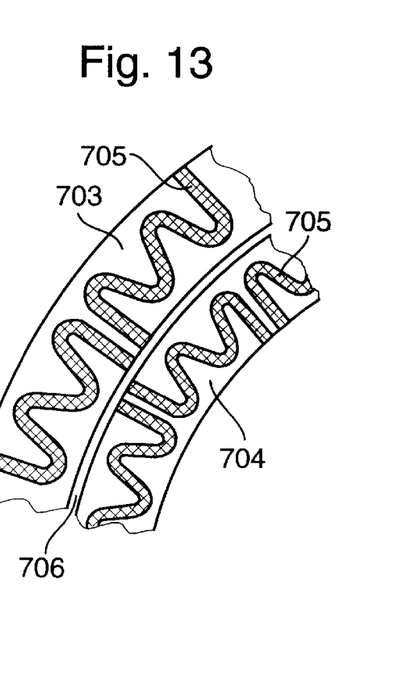
FIG. 13 shows portions of a two-part friction lining which is employed in the bypass clutch of FIG. 12.

FIG. 13 shows that the distribution of channels 705 in the friction surface of the part 703 of the composite friction lining of FIG. 12 need not be the same as that of the channels 705 in the friction surface of the part 704. It is also possible to provide the parts 703, 704 with identical or similar patterns or arrays of channels (and recesses or pockets, not shown), to provide channels only at the friction surface 703 or 704, or to provide channels only in one or more selected portions of the friction surface(s) of the part 703 and/or 704.

Figure 14:
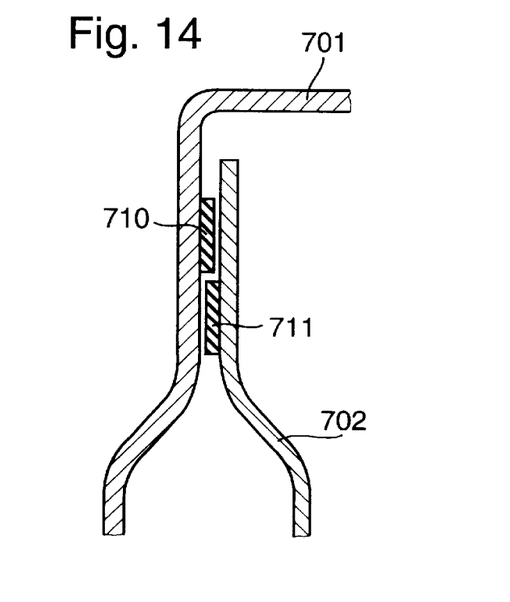
FIG. 14 is a view similar to that of FIG. 12 but showing a further embodiment of the improved bypass clutch.

Still further, it is possible to modify the parts of the composite friction linings (703, 704 and 710, 711) of FIGS. 12–13 and 14 in such a way that the channelled part of the friction surface (or the overall friction surface) of one of these friction lining parts greatly exceeds the channelled part of the friction surface (or the overall friction surface) on another part of the composite friction lining. This might be advisable if the quantity of friction heat to be withdrawn by the housing of the hydrokinetic torque converter greatly exceeds the quantity of friction heat to be withdrawn by the piston of the bypass clutch (or vice versa). For example, the radial width of one of the parts 703, 704 shown in FIG. 12 or of one of the parts 710, 711 shown in FIG. 14 can greatly exceed the radial width of the other of these parts.

Still further, the characteristics of the parts of a composite friction lining may but need not be identical. For example, the friction coefficient, stiffness and/or elasticity of the part 703 or 710 can deviate (greatly or at least slightly) from the corresponding characteristic(s) of the part 704 or 711.

An important advantage of the improved hydrokinetic torque converter and of its bypass clutch is that the useful life of the clutch and of the entire torque converter can be prolonged in a very simple, inexpensive, reliable and efficient manner. Thus, the component parts of the bypass clutch and of the corresponding or adjacent parts of the torque converter can be adequately cooled by the simple expedient of properly configurating one or more friction surfaces, such as the friction surface of a radially extending or frustoconical section of the housing of the torque converter, the friction surface of a friction lining which is carried by such housing section, a friction surface of the piston of the bypass clutch, a friction surface on a friction lining which is carried by the piston, one or more friction surfaces of an intermediate clutch plate or carrier between a housing section and the piston of the bypass clutch and/or the friction surface(s) of one or two friction linings on the carrier. The grooving and/or channelling of one or more friction surfaces can be carried out at a reasonable cost and by resorting to available machines.

The improved bypass clutch, certain parts of such bypass clutch, the bypass clutch and certain parts of the hydrokinetic torque converter, or the entire torque converter including the novel bypass clutch can be assembled into one or more simple and compact modules to simplify storage, transport to and installation at the locale of actual use. Moreover, the parts of the improved bypass clutch and/or of the entire torque converter can be readily designed, dimensioned and at least partially assembled in such a way that the installation work in an automobile assembly plant can be greatly simplified by omitting certain heretofore necessary steps and/or by carrying out such steps at the manufacturing plant. All this contributes to lower cost of the power train which employs the improved hydrokinetic torque converter and its bypass clutch.

Another important advantage of the improved bypass clutch and its heat withdrawing system or systems is that it is possible to employ less expensive materials for the making of the piston, carrier, housing section and/or friction lining(s) of the clutch because such parts are not or need not be heated to excessive temperatures and also because intensive heating, if any, takes place only for relatively short or very short intervals of time. The same applies for the fluid medium (such as oil) which is caused to flow in the channels of the friction surface or friction surfaces, i.e., such fluid is not subjected to and, therefore, need not be capable of standing elevated temperatures for long or very long intervals of time.

An additional important advantage of the improved bypass clutch is that it contributes to a reduction of losses due to drag as well as to a reduction of the likelihood or full prevention of untimely and undesirable engagement of the clutch. This is attributable to the presence of fluid in the pockets, recesses and channels of one or more friction surfaces. The likelihood of undesirable and untimely engagement of the bypass clutch is even less pronounced if the channels are designed to convey fluid streams in such a way that the fluid can follow the action of centrifugal force. This can be achieved by placing the outlets of the channels at the radially outer marginal portions of the component parts which are provided with such channels. The likelihood of untimely engagement of the improved bypass clutch is further reduced if the channels are distributed in a manner as shown, for example, in FIGS. 3 and 4, namely in such a way that certain channels carry fluid streams in a clockwise direction and the other channels confine the respective fluid streams to flow in a counterclockwise direction. Moreover, such design renders it possible to readily and predictably select the exact extent of engagement of the bypass clutch, i.e., a full disengagement, a complete engagement, or a desired extent of partial engagement. This holds true regardless of whether the vehicle in which the improved hydrokinetic torque converter and its bypass clutch are being put to use is in the process of pulling a load or is coasting.

The length of a channel, as measured in a circumferential direction of the respective annular friction surface, is less than the actual length of the channel because the latter is preferably provided with two or more bends which contribute to its overall length. For example, and as already mentioned hereinbefore, the overall length of a channel can be at least 1.5 times, preferably at least twice, the shortest distance between the inlet and the outlet of such channel, as measured circumferentially of the respective friction surface.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydrokinetic torque converters with bypass clutches and, therefore, such adaptations should and are intended to be comprehended within the meaning and range of equivalence of the appended claims.

What is claimed is:

1. A hydrokinetic torque converter comprising a rotary housing arranged to contain a supply of a fluid; a pump in said housing; a turbine disposed in and rotatable with and relative to said housing about a common axis; and a lockup clutch disposed in said housing and arranged to transmit torque between said housing and said turbine, said clutch having fully engaged and fully disengaged conditions as well as a plurality of partially engaged conditions and including at least one first friction surface and a substantially washer-shaped friction lining having at least one second friction surface contacting said at least one first friction surface in each of said partially engaged conditions and in said fully engaged condition of the clutch, said substantially washer-shaped friction lining having radially outer and radially inner marginal portions and said at least one second friction surface having a plurality of discrete elongated fluid conveying channels each having an inlet at one of said marginal portions and an outlet at the other of said marginal portions, one of said channels being arranged to convey a single stream of fluid from said inlet toward said outlet thereof in a first direction having a first component extending clockwise and circumferentially of said at least one substantially washer-shaped friction lining, and another of said channels being arranged to convey a single stream of fluid from said inlet toward said outlet thereof in a second direction having a second component extending counterclockwise and circumferentially of said substantially washer-shaped friction lining.

2. The torque converter of claim 1, wherein said inlet of each of said channels is disposed at said radially outer marginal portion and said outlet of each of said channels is disposed at said radially inner marginal portion of said friction lining.

3. The torque converter of claim 1, further comprising a stator in said housing between said turbine and said pump.

4. The torque converter of claim 1, wherein at least one of said channels has at least two bends disposed intermediate the respective inlet and the respective outlet, successive increments of the fluid stream flowing toward and from said bends having first and second components of flow one of which extends substantially radially of said friction lining from one of said marginal portions toward the other of said marginal portions and the other of which extends substantially radially of said friction lining from the other of said marginal portions toward said one marginal portion.

5. The torque converter of claim 4, wherein said at least one channel has between two and twelve bends.

6. The torque converter of claim 4, wherein said at least one channel has between four and ten bends.

7. The torque converter of claim 4, wherein at least one of said bends is configured to alter the direction of flow of said successive increments of the fluid stream through an angle of between 90° and 180°.

8. The torque converter of claim 4, wherein at least one of said bends is configured to alter the direction of flow of said successive increments of the fluid stream through an angle of between 120° and 170°.

9. The torque converter of claim 4, wherein at least one of said bends is configured to alter the direction of flow of said successive increments of the fluid stream through an angle of between 130° and 150°.

10. The torque converter of claim 4, wherein said at least one channel has an at least substantially straight portion between said at least two bends.

11. The torque converter of claim 10, wherein said at least substantially straight portion of said at least one channel and a radius extending from said axis across one of said at least two bends make an angle of between 0° and 50°.

12. The torque converter of claim 10, wherein said at least substantially straight portion of said at least one channel and a radius extending from said axis across one of said at least two bends make an angle of between 15° and 45°.

13. The torque converter of claim 1, wherein at least one of said channels has an at least substantially constant width and a depth which is less than ten percent of said width.

14. The torque converter of claim 13, wherein said depth is less than five percent of said width.

15. The torque converter of claim 1, wherein said at least one second friction surface has at least one recess adjacent at least one of said marginal portions.

16. The torque converter of claim 15, wherein said at least one recess is separated from said channels by a portion of said at least one second friction surface.

17. The torque converter of claim 15, wherein said channels have a first depth and said at least one recess has a second depth at least approximating said first depth.

18. The torque converter of claim 15, wherein said channels have a first depth and said at least one recess has a second depth different from said first depth.

19. The torque converter of claim 15, wherein said at least one second surface comprises a first portion including said channels and said at least one recess, and a second portion which is devoid of recesses and channels, the ratio of the area of said second portion to the area of said first portion being between 3 and 0.33.

20. The torque converter of claim 15, wherein said at least one second friction surface comprises a first portion including said channels and said at least one recess, and a second portion which is devoid of recesses and channels, the ratio of the area of said second portion to the area of said first portion being between 2.33 and 0.43.

21. The torque converter of claim 15, wherein said at least one second friction surface comprises a first portion including said channels and said at least one recess, and a second portion which is devoid of recesses and channels, the ratio of the area of said second portion to the area of said first portion being between 1.5 and 0.66.

22. The torque converter of claim 1, wherein said at least one second friction surface comprises a first portion including said channels and a second portion which is devoid of channels, the ratio of the area of said second portion to the area of said first portion being between 3 and 0.33.

23. The torque converter of claim 1, wherein said at least one second friction surface comprises a first portion including said channels and a second portion which is devoid of channels, the ratio of the area of said second portion to the area of said first portion being between 2.33 and 0.43.

24. The torque converter of claim 1, wherein said at least one second friction surface comprises a first portion including said channels and a second portion which is devoid of channels, the ratio of the area of said second portion to the area of said first portion being between 1.5 and 0.66.

25. The torque converter of claim 1, wherein at least one of said channels includes portions which are inclined relative to each other and has an overall length between the respective inlet and the respective outlet which is at least 1.5 times a length of said at least one of said channels in a circumferential direction of said friction lining.

26. The torque converter of claim 1, wherein at least one said channels includes portions which are inclined relative to each other and has an overall length between the respective inlet and the respective outlet which is at least twice a length of said at least one of said channels in a circumferential direction of said friction lining.

27. The torque converter of claim 1, wherein a radius extending from said axis and traversing said friction lining includes a first portion traversing at least one of said channels and a second portion traversing a part of said second friction surface which is devoid of channels, said second portion of said radius having a length which is between 0.5 times and twice the length of said first portion of said radius.

28. The torque converter of claim 1, wherein a radius extending from said axis and traversing said friction lining includes a first portion traversing at least one of said channels and a second portion traversing a part of said second friction surface which is devoid of channels, said second portion of said radius having a length which is between 0.7 times and 1.5 times the length of said first portion of said radius.

29. The torque converter of claim 1, wherein said second friction surface has a plurality of recesses adjacent at least one of said marginal portions, a radius extending from said axis and traversing said friction lining including a first portion traversing at least one of said channels and at least one of said recesses and a second portion traversing a part of said second friction surface which is devoid of channels and recesses, said second portion of said radius having a length which is between 0.5 times and twice the length of said first portion of said radius.

30. The torque converter of claim 1, wherein said second friction surface has a plurality of recesses adjacent at least one of said marginal portions, a radius extending from said axis and traversing said friction lining including a first portion traversing at least one of said channels and at least one of said recesses and a second portion traversing a part of said second friction surface which is devoid of channels and recesses, said second portion of said radius having a length which is between 0.7 times and 1.5 times the length of said first portion of said radius.

31. The torque converter of claim 1, wherein at least one of said friction surfaces has an undulate shape.

32. The torque converter of claim 31, wherein the undulate shape of said at least one friction surface is modulated in a circumferential direction of said friction lining.

33. The torque converter of claim 32, wherein said at least one friction surface has undulations with an amplitude in the range of between 0.005 mm and 1 mm.

34. The torque converter of claim 32, wherein said at least one friction surface has undulations with an amplitude in the range of between 0.1 mm and 0.75 mm.

35. The torque converter of claim 31, wherein at leat one of said friction surfaces has a finish other than a precision finish.

36. The torque converter of claim 1, wherein at least one of said friction surfaces has an undulate shape.

37. The torque converter of claim 36, wherein said undulate shape of said at least one friction surface is modulated in a circumferential direction of said friction lining.

38. The troque converter of claim 37, wherein said at least one friction surface has undulations with an amplitude in the range of between 0.005 mm and 1 mm.

39. The torque converter of claim 37, wherein said at least one friction surface has undulations with an amplitude in the range of between 0.1 mm and 0.75 mm.

40. The torque converter of claim 36, wherein at least one of said friction surfaces has a finish other than a precision finish.

41. A hydrokinetic torque converter comprising a rotary housing arranged to contain a supply of fluid; a pump in said housing; a turbine disposed in and rotatable with and relative to said housing about a common axis; and a lockup clutch disposed in said housing and arranged to transmit torque between said housing and said turbine, said clutch having fully engaged and fully disengaged conditions as well as partially engaged conditions and including at least one first friction surface and a substantially washer-shaped friction lining having at least one second friction surface contacting said at least one first friction surface in each of said partially engaged conditions and in said fully engaged condition of the clutch, said at least one friction lining having radially outer and radially inner marginal portions and said at least one second friction surface having at least two discrete elongated fluid conveying channels each having an inlet at one of said marginal portions and an outlet at the other of said marginal portions to convey a single stream of fluid in a direction from said inlet to said outlet thereof, each of said at least two channels including two sections extending substantially circumferentially of said substantially washer-shaped friction lining, one of said sections extending clockwise and the other of said sections extending counterclockwise as seen in a circumferential direction of said friction lining.

* * * * *